UNITED STATES PATENT OFFICE 2,411,722

SULFUR-DIOXIDE MODIFIED TETRA-FLUOROETHYLENE POLYMER

Jesse Harmon and Robert M. Joyce, Jr., Wilmington, Del., assignors to E. I. du Pont de Nemours & Company, Wilmington, Del., a corporation of Delaware No Drawing. Application September 21, 1945, Serial No. 617,930

4 Claims. (Cl. 260—80)

This invention relates to polymeric materials and more particularly to sulfur dioxide-modified tetrafluoroethylene polymers.

Polytetrafluoroethylene is a hard, tough, infusible solid which is insoluble in and unattacked by inorganic acids, alkalies and organic solvents. While this combination of properties is very desirable for a great many applications, many of these properties make the polymer unsuitable for other uses.

This invention has as an object new and useful compositions of matter. A further object is the preparation of sulfur dioxide-modified tetrafluoroethylene polymers. A still further object resides in the sulfur dioxide-modified polymers which are characterized by lower melting point and improved workability. Additional objects will become apparent from an examination of the following description and claims.

These and other objects and advantages are accomplished according to the herein described invention which comprises polymerizing tetrafluoroethylene in the presence of sulfur dioxide under substantially anhydrous conditions and in the absence of diluents using an organic peroxy compound as catalyst as more fully described hereinafter.

The following example, in which proportions are in parts by weight unless otherwise specified, is given for illustrative purposes and is not intended to place any restrictions on the herein described invention.

Example

A silver-lined shaker tube was swept with nitrogen and charged with one part of benzoyl peroxide. The head was fastened to the tube and the tube was evacuated and charged with 128 parts of sulfur dioxide and 50 parts of tetrafluoroethylene through a valve. The valve was closed and the tube was shaken first at room temperature for three hours and then for four hours at 80° C. The tube was then cooled and the unreacted sulfur dioxide and tetrafluoroethylene were removed by releasing the pressure. The product consisted of 21 parts of a hard, brittle, tan-colored solid. The product when fused was a mobile liquid, whereas unmodified polytetrafluoroethylene retained its form when heated at temperatures as high as 400° C. The sulfur dioxide-modified tetrafluoroethylene polymer was non-flammable, melted at 310° C., was insoluble in water, dioxane, acetic acid, ethanol, xylene and acetone. It was unaffected by hot dilute alkali or acid but was darkened by hot concentrated sulfuric acid. It contained 0.47% sulfur, or an average ratio of one sulfur dioxide unit to 67.4 tetrafluoroethylene units.

The sulfur dioxide-modified tetrafluoroethylene polymers of this invention are macromolecular polymers having the empirical formula $$(C_2F_4)_x.(SO_2)_y$$

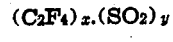

wherein $x$ and $y$ are integers, the ratio of $x$ to $y$ being within the range of from 1:1 to 125:1. Those of greatest utility have the empirical formula $(C_2F_4)_x.(SO_2)_y$, as hereinbefore defined, in which the ratio of $x$ to $y$ is within the range of from 6:1 to 125:1.

The ratio of $SO_2$ to $C_2F_4$ in the polymers of this invention may be varied within the above limits by varying the mol ratio of sulfur dioxide to tetrafluoroethylene in the reaction mixture. Thus, said ratio in the reaction mixture may be varied widely; although usually the mol ratio of sulfur dioxide to tetrafluoroethylene in the reaction mixture is within the range of from 1:10 to 10:1.

The catalysts used in the practice of this invention are organic peroxy compounds, e. g., those organic compounds which contain a —O—O— structure. Examples of these compounds are: diacyl peroxides, such as benzoyl peroxide, dilauroyl peroxide; dialkyl peroxides, such as diethyl peroxide, di(tert. butyl) peroxide; and alkyl hydroperoxides, such as tert. butylhydroperoxide. Appreciable effects are had when the amount of catalyst employed is as low as 0.001% and when it is as high as 5% of the sum of the weights of the sulfur dioxide and tetrafluoroethylene in the reaction mixture. The use of amounts of catalyst lower than 0.001% and higher than 5% is not recommended for economic reasons since inferior results are obtained when the catalyst is employed outside the indicated range. Optimum results are obtained when the amount of catalyst employed is within the range of from 0.01% to 1% based upon the total weight of the sulfur dioxide and tetrafluoroethylene in the reaction mixture.

The process of this invention can be carried out at a temperature within the range of from 0° C. to 200° C. The reaction is generally carried out within the range of from 25° C. to 150° C. The polymerization is carried out under superatmospheric pressure, generally autogenous pressure, and usually within the range of from three atmospheres up to 1000 atmospheres. The maximum possible pressure apparently is limited only by the apparatus available.

The products of this invention are characterized by improved workability and lower softening temperatures compared to those of unmodified tetrafluoroethylene polymers. They may be used as molding plastics, films, fibers and adhesives and as electrical insulation.

As many apparently widely different embodiments of this invention may be made without departing from the spirit and scope thereof, it is to be understood that we do not limit ourselves to the specific embodiments thereof except as defined in the appended claims.

Having described the present invention, the following is claimed as new and useful:

1. A macromolecular polymer having the empirical formula $(C_2F_4)_x.(SO_2)_y$, wherein $x$ and $y$ are integers, the ratio of $x$ to $y$ being within the range of from 1:1 to 125:1.

2. A macromolecular polymer having the empirical formula $(C_2F_4)_x.(SO_2)_y$, wherein $x$ and $y$ are integers, the ratio of $x$ to $y$ being within the range of from 6:1 to 125:1.

3. The process for obtaining a sulfur dioxide-modified tetrafluoroethylene polymer which comprises subjecting to superatmospheric pressure and a temperature within the range of from 0° C. to 200° C. a mixture consisting of sulfur dioxide, tetrafluoroethylene and as catalyst an organic peroxy compound.

4. The process for obtaining a sulfur dioxide-modified tetrafluoroethylene polymer which comprises subjecting to a pressure within the range of from three atmospheres to 1000 atmospheres and a temperature within the range of from 25° C. to 150° C., a mixture consisting of sulfur dioxide, tetrafluoroethylene and benzoyl peroxide, the mol ratio of sulfur dioxide to tetrafluoroethylene being within the range of from 1:10 to 10:1 and the benzoyl peroxide being present in an amount within the range of from 0.01% to 1% of the sum of the weights of the sulfur dioxide and tetrafluoroethylene.

JESSE HARMON.
ROBERT M. JOYCE, Jr.